United States Patent [19]

Fuller et al.

[11] Patent Number: 5,186,870

[45] Date of Patent: Feb. 16, 1993

[54] PROCESS FOR FABRICATING AN IR TRANSMITTING OPTICAL FIBER

[75] Inventors: Terry A. Fuller, Highland Park; Vijay J. Nadkarni, Mundelein; John R. Peschke, Woodstock, all of Ill.

[73] Assignee: Fuller Research Corporation, Huntingdon Valley, Pa.

[21] Appl. No.: 134,276

[22] Filed: Dec. 17, 1987

[51] Int. Cl.$^5$ .................. B29C 47/06; B32B 31/30; G02B 6/16; G02B 6/18

[52] U.S. Cl. .................. 264/1.2; 264/1.5; 264/1.6; 264/1.7; 264/85; 264/171; 264/211.11; 264/514; 264/570; 385/141

[58] Field of Search ............ 264/1.2, 1.5, 1.6, 1.7, 264/85, 171, 211.11, 514, 570; 350/96.29, 96.3, 96.34

[56] References Cited

U.S. PATENT DOCUMENTS

| | | | |
|---|---|---|---|
| 4,253,731 | 3/1981 | Anderson et al. | 350/96.34 |
| 4,490,008 | 12/1984 | Murakami et al. | 350/96.34 |
| 4,504,298 | 3/1985 | Yokota et al. | 350/96.34 X |
| 4,521,073 | 6/1985 | Murakami et al. | 350/96.34 |
| 4,552,434 | 11/1985 | Murakami et al. | 350/96.30 |
| 4,583,821 | 4/1986 | Murakami et al. | 350/96.34 |
| 4,678,274 | 7/1987 | Fuller | 350/96.34 |
| 4,721,360 | 1/1988 | Murakami et al. | 350/96.34 |

FOREIGN PATENT DOCUMENTS

| | | | |
|---|---|---|---|
| 56-43607 | 4/1981 | Japan | 350/96.34 |
| 56-89704 | 7/1981 | Japan | 350/96.34 |
| 56-104302 | 8/1981 | Japan | 350/96.34 |
| 57-13410 | 1/1982 | Japan | . |
| 58-43404 | 3/1983 | Japan | . |
| 60-404 | 1/1985 | Japan | 350/96.34 |
| 912779 | 3/1982 | U.S.S.R. | 264/1.2 |

OTHER PUBLICATIONS

Bendow, B. et al., "Infrared Fibers: An Overview of Prospective Materials, Fabrication Methods and Applications," Optical Engineering, vol. 24, No. 6 (Nov. 1985), pp. 1072-1080.

Bridges, T. J. et al., "Single-Crystal AgBr Infrared Optical Fibers," Optics Letters, vol. 5, No. 3 (Mar. 1980), pp. 85-86.

Krus, D. J. et al., "Crystal Materials for Infrared Fibers," Proc. Soc. Photo-Opt. Inst. Eng., vol. 226 (1981), pp. 72-77.

Chen, D. et al., "Fabrication of Silver Halide Fiber by Extrusion," Fiber Optics: Advances in Research and Development, ed. B. Bendow et al., Plenum, N.Y. (1977), pp. 119-122.

Pinnow, D. A. et al., "Polycrystalline Fiber Optic Waveguides for Infrared Transmission," App. P. Letters, vol. 33, No. 1, Jul, 1, 1987, pp. 28-29.

Vasil'ev, A. V. et al., "Single-crystal fiber waveguides for the middle infrared range," Sov. J. Quantum Electron, vol. 11, No. 6, Jun. 1981, pp. 834-835.

Mimura, Y. et al., "CsBr Crystalline Fiber for Visible and Infrared Transmission," Japanese J. of App. Physics, vol. 20, No. 1, Jan., 1981, pp. L17-L18.

Harrington, J., "Crystalline Infrared Fibers," Proc. Soc. Photo-Opt. Inst. Eng., vol. 226, Feb. 1981.

Harrington, J. et al., "Scattering Losses in Single and Polycrystalline Materials for IR Fiber Applications", Adv. in Cerm., vol. 2, pp. 94-103, 1981.

Sakuragi et al., "IR Transmission Capabilities of Thallium Halide and Silver Halide Optical Fibers," Adv. in Cerm.; vol. 2, pp. 84-93, 1981.

Lewis, C. F., "Ceramics Fire the Imagination", Mat'l. Eng., Jul. 1986, pp. 31-35.

Primary Examiner—Jeffery Thurlow
Assistant Examiner—Leo B. Tentoni
Attorney, Agent, or Firm—Seidel, Gonda, Lavorgna & Monaco

[57] ABSTRACT

The present invention is directed to a process for manufacturing a cladded optical fiber. The cladding and core are halide materials. An interface for inhibiting radiation scatter is provided at the boundary between the halide cladding and the halide core. The process steps include extruding a first halide or halide core from a first chamber, and extruding a second halide or halide cladding from a second chamber into contact with the halide core. The halide cladding is joined to the halide core at the boundary.

28 Claims, 4 Drawing Sheets

PROCESS FOR FABRICATING AN IR TRANSMITTING OPTICAL FIBER

SCOPE OF THE INVENTION

The present invention is directed to a cladded optical fiber for transmission of electromagnetic energy in the infrared region and a co-axial extrusion process for fabricating such fibers.

BACKGROUND OF THE INVENTION

There is a need for an optical fiber, having a halide core with a halide cladding, for the transmission of infrared electromagnetic radiation, which is capable of economical mass production, yet minimizes radiation transmission losses. Transmission losses arise from impurities in the halide starting materials, from impurities in the halide materials introduced from the extruder and the extruder die, from irregular surface boundary conditions at the core-cladding interface, from non-uniform mixing of the core and the cladding materials at the interface, and from the presence of grain boundaries between the numerous crystals forming the core. Each of these problems decreases the transmission efficiency of the core material by increasing the scatter of the transmitted electromagnetic radiation.

U.S. Pat. No. 4,253,731 discloses a metal halide (AgBr) fiber (or core) which is clad with another metal halide (AgCl). The silver bromide core has a fine-grained crystalline structure which is produced by an extrusion process, preferably in the low temperature range set forth in FIG. 3 of the patent. In the extrusion process, a co-axial or composite billet, i.e. a sleeve of cladding surrounding a cylindrical core, is heated in a single chamber and extruded through a diamond die according to FIG. 2 of U.S. Pat. No. 4,253,731.

Chen, D. et al, "Fabrication of Silver Halide Fiber by Extrusion," *Fiber Optics: Advances in Research and Development*, ed. by B. Bendow et al, Plenum, N.Y., p. 119–122, 1977, also, discloses a clad fiber similar to the one described in U.S. Pat. No. 4,253,731.

Japanese Patent Application No. 1980-87508, published in the Japan Patent Journal No. 1982-13410, discloses two embodiments of an infrared optical fiber and methods of producing each. In the first embodiment, a cladded optical fiber is produced by a first extrusion step from a composite billet. The resulting cladded fiber is then subjected to a second extrusion step during which a plastic coating, e.g. polyethylene, polypropylene, nylon-6, polyacetal or acrylic, is applied on the cladded fiber.

According to the second embodiment of Japanese Patent Application 1980-87508, an uncladded optical fiber having a plastic coating is produced in a two-step extrusion process. An uncladded metal halide billet, i.e. not a composite billet, is extruded into a fiber during a first step, and a plastic coating is then extruded around the fiber in a second step.

U.S. Pat. No. 4,678,274, assigned to the assignee of the hereof patent application, discloses a cladded optical fiber, having a halide core and halide cladding extruded from a composite billet having a covering of a polymer film.

Pinnow, D.A. et al, "Polycrystalline Fiber Optic Waveguides For Infrared Transmission", *Applied Physics Letters*, Vol. 33, No. 1, Jul. 1, 1987, disclose optical fibers formed by extrusion of thallium bromide or thallium bromoiodide. The extruded fibers are then sheathed in a loose-fitting polymer sleeve. The core fibers are polycrystalline.

Japanese Patent Application No. 1981-140929, published in Japan Patent Journal No. 1983-43404, discloses an improved extrusion die for producing optical fibers from halide billets. Contamination of the billet from chamber wall impurities is reportedly avoided by a die which has a diameter less than the diameter of the billet. The die has a beveled attack surface which meets the billet. The die, in effect, shears off an annular portion of the billet which contains the contaminants.

Vasil'ev, A.V. et al, "Single-Crystal Fiber Waveguides For The Middle Infrared Range," *Sov. J. Quantum Electron.*, Vol 11, No. 6, Jun., 1981, disclose a single-crystal halide optical fiber which is grown in capillaries. The single-crystal fibers do not have a cladding U.S. Pat. No. 4,583,821 discloses a cladded optical fiber, formed from mixed AgBr/AgCl crystals surrounded by a protective layer. The clad fiber is extruded from a composite billet as discussed in U.S. Pat. No. 4,253,731. An extrusion temperature between 100° C. and 380° C. is reported.

U.S. Pat. No. 4,552,434 discloses an optical fiber having a halide core and a halide cladding (See FIG. 9a) which is produced by placing a core billet into a sleeve of cladding and drawing the sleeve into contact with the core billet. A gap of about 0.01–0.1 mm is maintained between the billet core and the sleeve cladding before the drawing step. The following drawing temperatures are disclosed for the halide material of U.S. Pat. No. 4,552,434: 120° C.–358° C. for KRS-5; 100°–370° C. for silver chloride; 180°–370° C. for cesium iodide (melting point 626° C.).

Mimura, Y. et al, "CsBr Crystalline Fiber For Visible and Infrared Transmission," *Japanese Journal of Applied Physics*, Vol. 20, No. 1, p. L17–L18 (Jan. 1981), disclose a cesium bromide optical fiber which is inserted into a polytetrafluroethylene (TEFLON ®) jacket.

Japanese Public Patent Disclosure Bulletin No. 56-104302 discloses an optical fiber with a halide core and a halide cladding. This fiber is produced by forming a composite billet, placing the billet into a sealed metal pipe, and drawing down the pipe's diameter, i.e. cold working, until the desired fiber diameter is reached.

Harrington, J., "Crystalline Infrared Fibers," *Proc. Soc. Photo-Opt. Inst. Eng.*, Vol. 226, Feb. 1981, and Harrington, J. et al., "Scattering Losses in Single and Polycrystalline Materials for IR Fiber Applications," *Adv. in Ceramics*, Vol. 2, pp. 94–103 (1981) studied the scattering losses in single crystal and polycrystalline KCl and KRS-5. The authors report that polycrystalline materials scatter more radiation than single crystal materials.

Sakuragi, S. et al, "IR Transmission Capabilities of Thallium Halide and Silver Halide Optical Fibers," *Adv. In Ceramics*, Vol. 2, pp. 84–93, 1981, describe experiments with unclad halide fibers.

SUMMARY OF THE INVENTION

The present invention is directed to a process for manufacturing a cladded optical fiber. The cladding and core are halide materials. An interface for inhibiting radiation scatter is provided at the boundary between the halide cladding and the halide core. The process steps include extruding a first halide or halide core from a first chamber, and extruding a second halide or halide cladding from a second chamber into contact with the halide core. The halide cladding is joined to the halide core at the boundary.

DESCRIPTION OF THE DRAWING

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
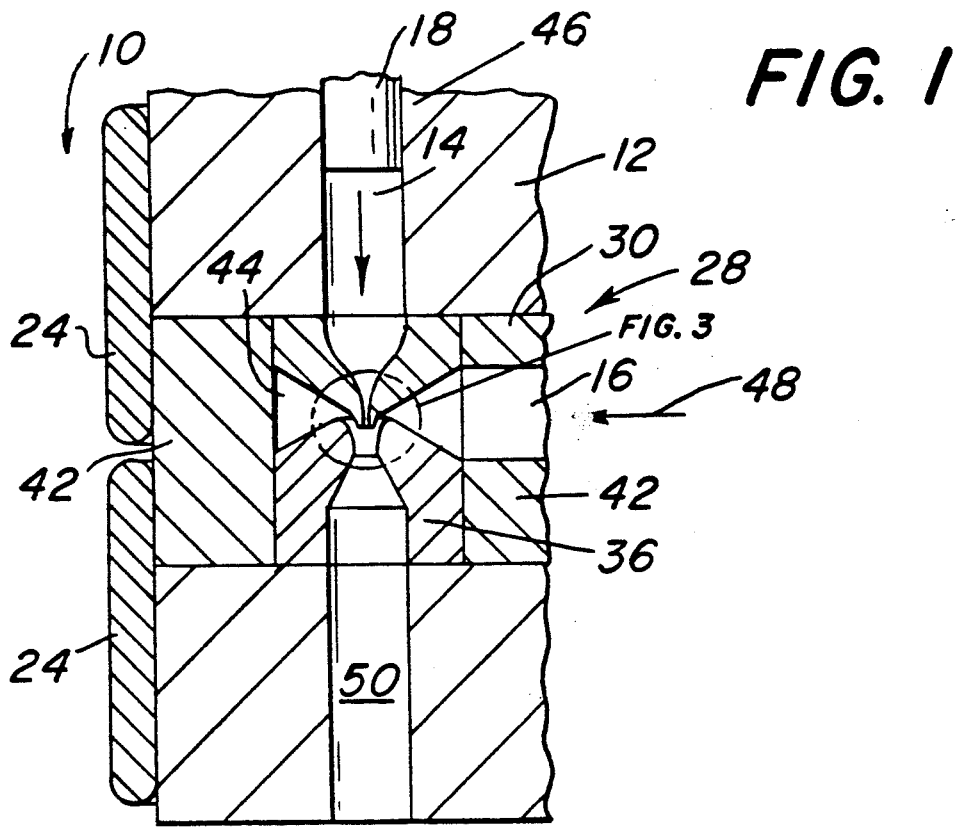
FIG. 1 is sectional schematic view of the extrusion apparatus and illustrates the co-axial die assembly and a direct extrusion plunger.

Referring to the drawings, wherein like numerals indicate like elements, there is shown in the drawings part of an extrusion apparatus 10. Extrusion apparatus 10 is merely exemplary of any typical extrusion apparatus and is not limiting on the present invention as will be apparent from the discussion below. "Extruding", as used herein, refers to any process or apparatus which delivers material to an extruding die, i.e. plungers, pumps, screw feeders, etc.

The process, described hereinafter, is an extrusion process used to make an optical fiber having a substantially single crystal halide core with a polycrystalline halide clad joined thereto. The optical fiber is described in greater detail below. The process utilizes separate extrusion chambers for receipt of the individual halide billets for the core and clad. Both to, but below, the halides' melting points, and then rammed through a co-axial die. The co-axial die, in communication with both chambers, forms the core and applies the clad thereto in a manner which substantially eliminates core and clad material mixing at the core-clad interface, yet joins the core to the clad at the interface and forms a smooth interface. The resulting cladded halide optical fiber transmits IR radiation by providing a substantially single crystal core and by minimizing leakage losses at the interface.

Apparatus 10 includes a body 12 having a first chamber 14 and a second chamber 16. Both chambers 14 and 16 may have a diameter of between about 0.1–0.6 inches (2–15 mm) and a length of between about 2 to 10 inches (50–250 mm) and are sized to receive a billet, e.g. a solid cylinder or rod. However, these dimensions are merely exemplary. Other dimensions readily apparent to those skilled in the art are possible. Both chambers 14 and 16 are in communication with a die assembly 28.

Body 12 is surrounded by a plurality of heating elements 24. Heating elements 24 are conventional and provided with sufficient heating capacity to heat the extrusion apparatus, the halide materials and the dies to a temperature high enough such that the halide materials are ductile, but below the melting temperature of the halide material.

The extrusion apparatus 10 should also be provided with an inert gas purge system which allows the halide starting materials and resulting clad fiber to be surrounded with a gas, such as argon, helium, etc. The gas displaces any contaminating gas (moist air, etc.) and significantly decreases oxidation, corrosion and other reactions between the tooling materials and the halides. The gas, thereby, improves the quality of the finished product.

Figure 2:
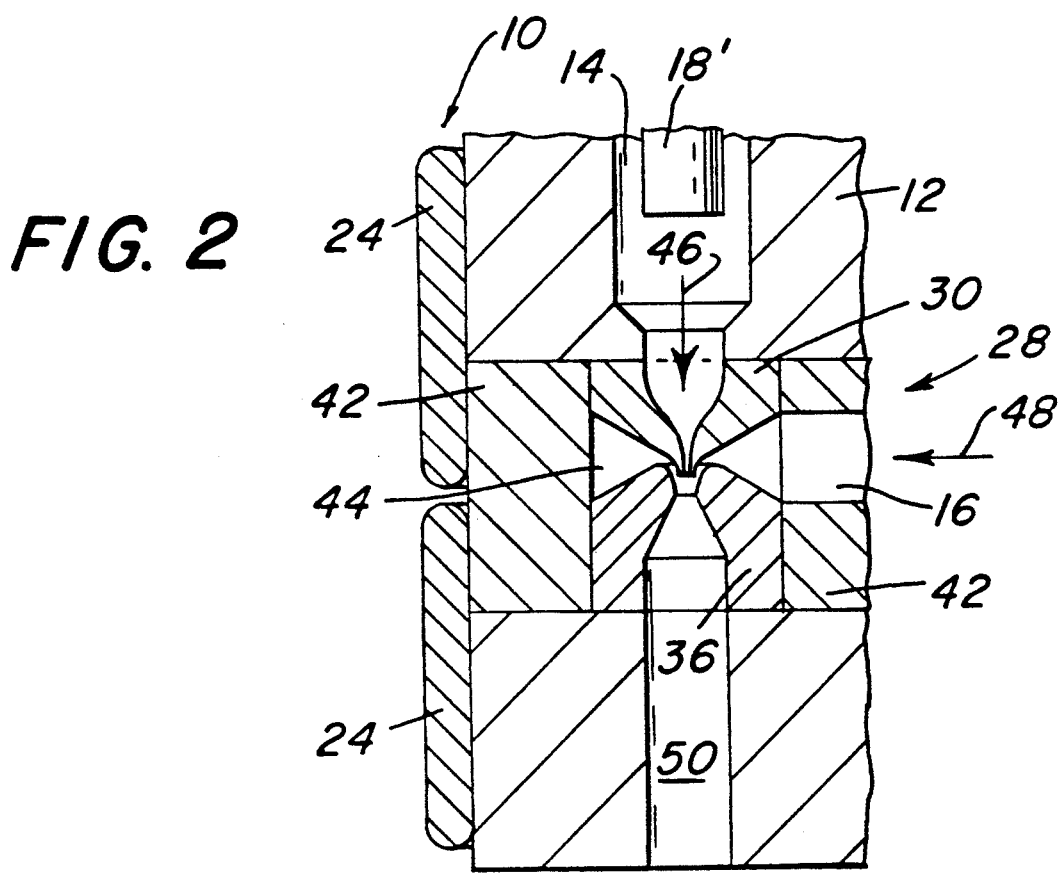
FIG. 2 is a sectional schematic view of the extrusion apparatus and illustrates the co-axial die assembly and a hydrostatic extrusion plunger.

First and second plungers are provided for insertion into their respective chambers. The plungers are driven by an actuator (not shown) which is conventional. The plungers may be either a direct plunger as illustrated by plunger 18 in FIG. 1, or a hydrostatic plunger as illustrated by plunger 18' in FIG. 2. Either type of plunger can be used in either chamber. The direct plunger 18 has a diameter which extends across the entire internal diameter of its chamber. The hydrostatic plunger 18' has a diameter which is less than the internal diameter of the chamber. Moreover, the plungers essentially create a fluid pressure, thus it should be understood that a high pressure, halide or other material, pumping system that effects the appropriate fluid type pressure could also be considered within the scope of this invention.

The hydrostatic plunger 18' has a number of advantages over the direct plunger 18. The hydrostatic plunger permits a more uniform exertion of force on the material within the chamber. It reduces the extrusion force by reducing friction between the plunger and the chamber wall and creates a buffer from the potentially contaminating chamber wall. It may be readily appreciated that the hydrostatic plunger uses the ductile material within the chamber as a lubricating fluid to reduce wall friction. The ductile material in the buffer zone prevents migration of contaminants from the chamber wall into the central portion of the ductile material which is extruded.

Figure 3:
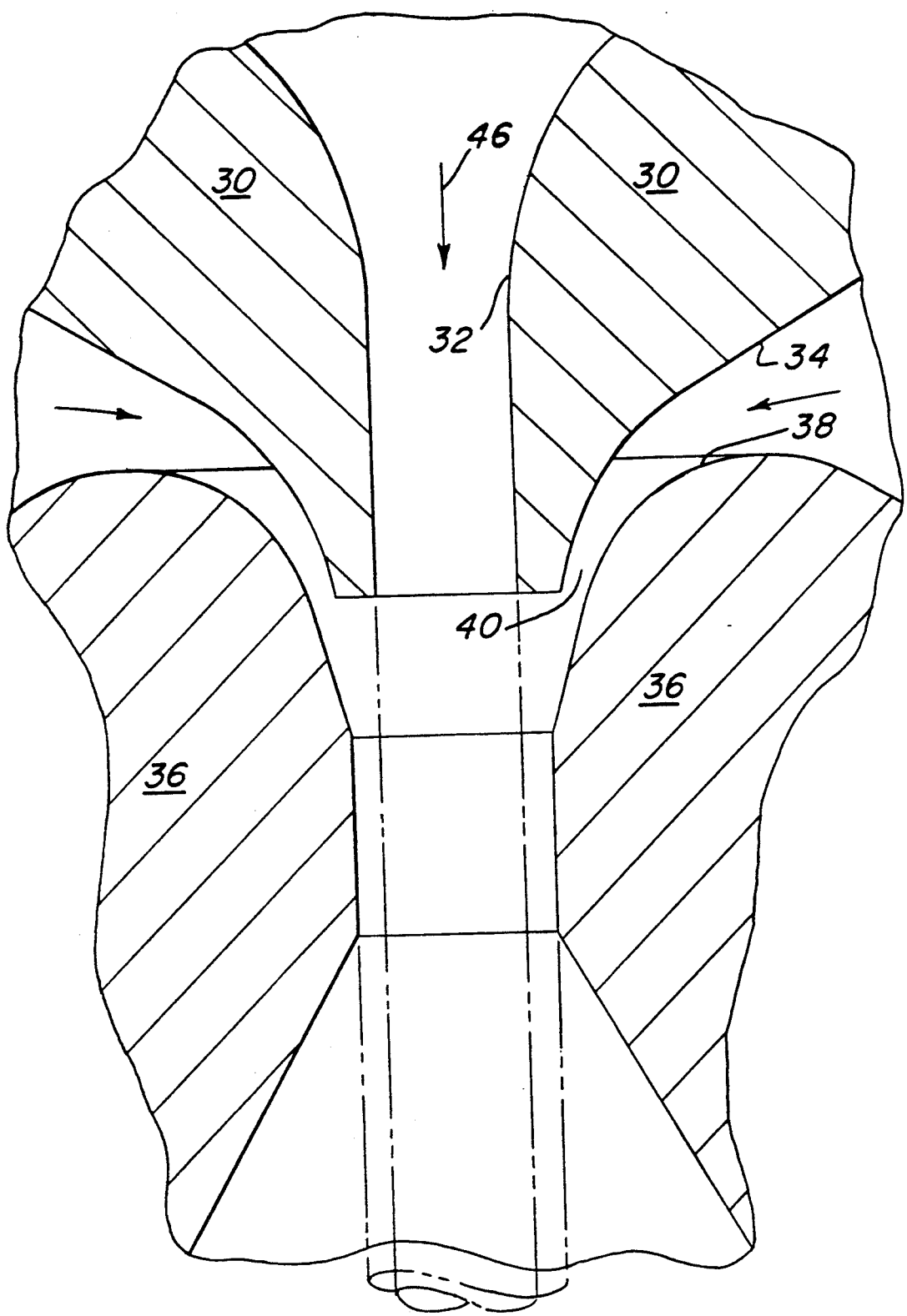
FIG. 3 is an enlarged schematic view of the coaxial die assembly

A coaxial extrusion die is shown as die assembly 28 and comprises an upper die 30, a lower die 36 and a holder 42. See FIG. 3. Upper die 30 is in communication with first chamber 14 and is provided with a halide flow passage 46 defined by a fiber-forming surface 32. The passage 46 is configured to reduce the cross-sectional area of the chamber to the diameter of the fiber core. A claddingforming surface 34 is provided on upper die 30 and is coaxial with the halide flow passage. The lower die 36 is also provided with a through passage which terminates into outlet 50 and includes a clad-forming surface 38. The passage through the lower die 36 is aligned with and downstream from the first-mentioned flow passage 46. The passage through lower die 36, at its narrowest point, has a diameter equivalent to the diameter of the clad fiber (i.e. the core plus the clad). Both upper die 30 and lower die 36 are surrounded by a holder 42 which includes a flow passage 48 there-through. Flow passage 48 is in communication with second chamber 16.

Upper die 30, lower die 36, and holder 42 define an annular channel 44 through which cladding material is allowed to surround the fiber-forming passage through upper die 30. Alternately, holder 42 can be made part of dies 30 and 36 or part of one or the other die. Channel 44 is in communication with flow passage 48. Clad forming-surface 34 of upper die 30 and clad-forming surface 38 of lower die 36 define a clad-compression channel 40 which is co-axial with the fiber-forming passage 46 of. upper die 30. See FIG. 3. The above-described die configuration allows uniformity of material velocity at a point where the core material and the clad material meet.

At the beginning of operation, the core is preferably extruded slightly ahead of the cladding, however, the cladding could be extruded ahead of the core or both the core and cladding may be extruded together During the operation both core and cladding exit together and at the same rate.

The materials of construction for the plungers, body, and co-axial extrusion die assembly are chosen to have mechanical strength and resistance to corrosion at the required operating temperatures which are close to, but just below, the halides melting points For example, when dealing with softer, lower melting point material, such as the thalleous halides (e.g., KRS-5 and KRS-6), materials such as steel, chrome-coated steel, nickel or TIC (titanium carbide), are satisfactory. The extrusion temperatures of those halides are sufficiently low to permit the use of softer tooling materials which provide sufficient strength and corrosion resistance.

Other halides, such as NaBr or KCl, are harder and have significantly higher melting temperatures than KRS-5 and KRS-6. Extrusion of these higher-melting materials requires different tooling materials to provide the necessary strength and corrosion resistance. For example, materials such as hardened high nickel, high chrome alloys, ceramics or other very high temperature metal or ceramic alloys, alone or with coating or surface modifications are required.

When very corrosive halides are being extruded, or extrusion is through uncoated tooling, the risk of contamination of the fiber-forming materials may be reduced by hydrostatic extrusion.

The selection of materials for the dies is also of importance and follows from the above discussion. The fiber-forming surface 32, and clad forming surfaces 34 and 38, should be finished to a surface roughness of less than approximately 10 micro-inches, and preferably less than 5 micro-inches. These surfaces may be diamond, but this may not be economically feasible. Moreover, diamonds may not be suitable for extrusion at very high temperatures because of diamond degradation. The preferred materials of construction for the die are solid ceramics, such as aluminum oxide-titanium carbide and Sialon (i.e. Si—Al—O—N). With regard to Sialon, see "Ceramics Fire the Imagination", *Materials Engineering*, Jul., 1986, pp. 31–35. Aluminum oxide is also a highly non-reactive material which is capable of producing a smooth optically-clear halide fiber. Moreover, these relatively inexpensive ceramics can be fabricated into a wide variety of die geometries. The surface finish, roughness and coating, are applied along the entire halide-contacting surfaces of the die, not just along the exit end of the die.

Dies formed from carbide or ceramic-coated metals may be used when extruding lower-melting halides. However, use of these die materials is unsatisfactory when extruding high-melting halides.

The halide materials used in the above-described apparatus include metal halides, alkali earth halides or alkali halides. Preferably, these halides are selected from group Ia, Ib and IIIa halides and mixtures thereof, for example, Ia: NaCl, NaBr, NaI, KCl, KBr, CsI, CsBr;
Ib: AgBr, AgCl, AgI;
IIIa: TlBr, TlCl, TlI, thallium bromide-iodide or "KRS-5", thallium bromide-chloride or "KRS-6";
Mixed Halides: TlBr:TlI, AgBr:AgCl.

The extruded materials should be essentially contamination-free and either crystalline or polycrystalline. Pure, doped, or mixed halides may be selected to provide the desired index of refraction, strength or other pertinent characteristics as is known in the art. Sintered powder compacts may not be suitable as extruded materials because of impurity absorption on surfaces and potential incorporation of foreign particles. However, if these purification problems can be overcome, sintered powder compacts are suitable for use in the invention.

Optical quality halide billets suitable for the use in the process of the invention are available from the following: Harshaw Chemical Co., Solon, Ohio; Optovac Company, N. Brookfield, MA; E. Merck, Darmstat, W. Germany; Fluka Chemical Corp., Ronkonkoma, NY; Heico Div., Whittaker Corp., Delaware Water Gap, PA. If higher purity billets are needed, they may be grown from melt according to well known purification and growth processes, such as the Bridgeman or the Czochralski process The Bridgeman growth provide a highly purified single crystalline ingot.

The halide used to form the cladding layer should have an index of refraction lower than the core halide.

Figure 4:
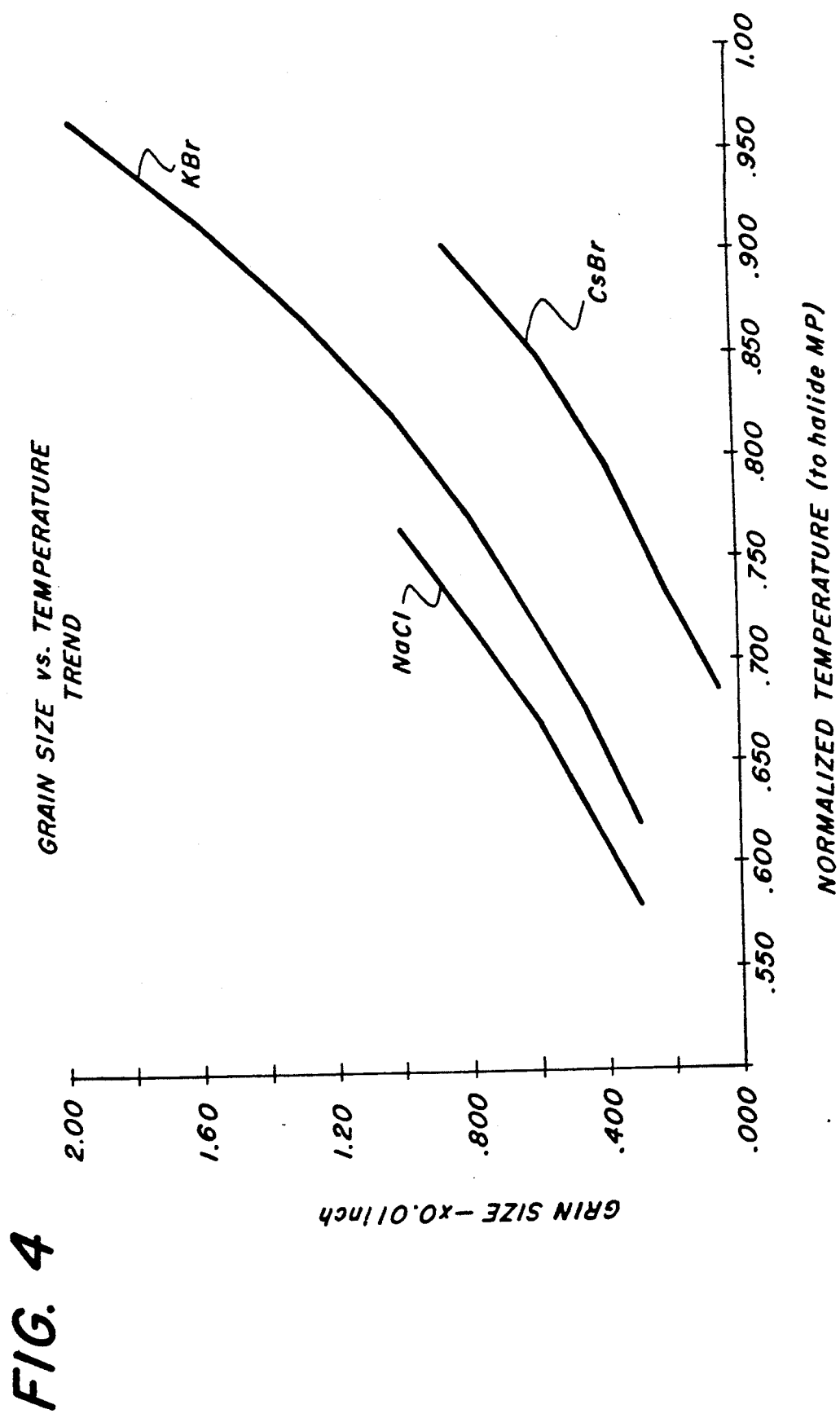
FIG. 4 is a graph illustrating the relationship between crystal grain size of the fiber core and extrusion temperature (normalized to halide melting point, 1.00 being the melting point of the material).

Clad fibers having substantially single crystal cores are produced from the process of the present invention when extrusion temperatures approaching the halide melting temperature are used. FIG. 4 illustrates the dependency of core crystal size on extrusion temperature for NaCl, KBr and CsBr. It is apparent from FIG. 4 that crystal grain size increases as the extrusion temperature approaches the melting point of the extruded materials. Therefore, it is preferred to extrude the halide materials close to their respective melting temperatures as reasonably possible.

The upper limit of the extrusion temperature is dictated, in one aspect, by the condition of the exiting fiber. For example, a temperature is reached beyond which the newly-extruded hot fiber cannot support its own weight. Useable extrusion temperatures are further limited, in another aspect, by limitations in accurately monitoring and controlling the extrusion temperature.

The information presented in FIG. 4 is intended to be exemplary of the relationship between halide extrusion temperature (the extrusion temperatures are normalized to the specific halide's melting point) and crystal grain size. The same information is readily obtainable for other halides via experimentation in which the halide material is brought to various temperatures below its melting point and extruded. The solidified halides are then examined, in known ways, to determine the crystal grain sizes. The curves of FIG. 4 are averages of several extrusion velocities (approximately 8 inches per minute to about 80 inches per minute) and several fiber diameters (about 0.017 inches to 0.030 inches).

Fibers according to the present invention may be manufactured at velocities as high as 5,000 mm per minute (approximately 200 inches per minute). Those skilled in the art will appreciate that this upper velocity limit is dictated, in part, by the strength of the tooling materials.

The optical fiber produced by the instant process provides a substantially single crystal core having a polycrystalline cladding with a relatively smooth clad-core interface which inhibits electromagnetic radiation scatter. intimately and essentially coaxially in contact with the clad, yet there is little-to-no mixing of the core and clad materials.

"Substantially single crystal" core means not only a core comprising a single crystal, but also includes cores formed by a small number of large single crystals, which have the transmission properties which are desired. It is the object of the invention to minimize the number of separate crystals comprising the fiber core, preferably to a single unitary crystal. Sectioning the fibers of the invention laterally reveals that any such lateral cross-section (i.e., perpendicular to the longitudinal axis of the fiber or an axial face) intersects only one, two or generally not more than three crystals. Longitudinal sectioning may reveal the presence of a somewhat greater number of crystals along the length of the fiber core.

Figure 7:
FIG. 7 shows a prior art cladded fiber at a magnification of 100 times (polycrystalline KBr core and polycrystalline KCl cladding) made from a composite billet, as described in U.S. Pat. No. 4,678,274.
Figure 8:
FIG. 8 shows a prior art cladded fiber at a magnification of 80 times.
Figure 5:
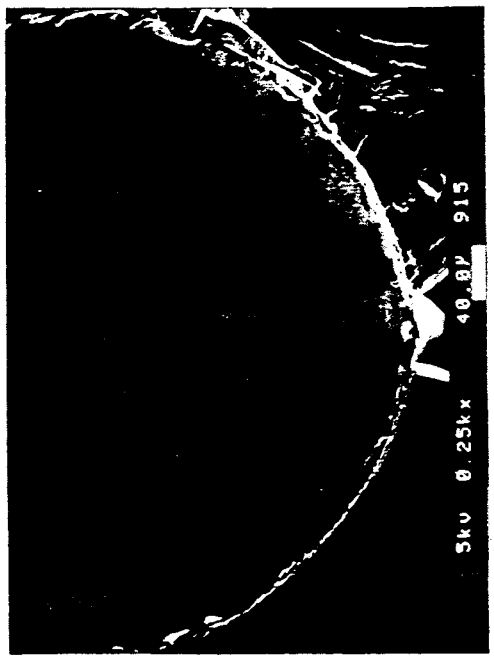
FIG. 5 shows a cladded optical fiber of single-crystal KBr core and a polycrystalline KCl cladding at a magnification of 250 times which is made in accordance with the present invention.
Figure 6:
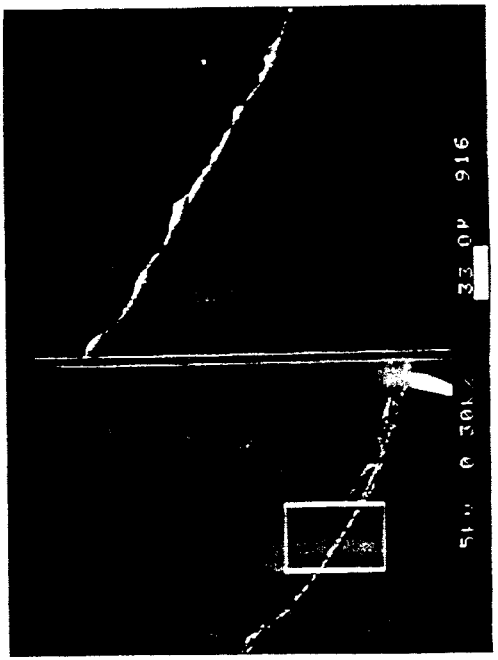
FIG. 6 on the left, shows the cladded fiber of FIG. 5 at a magnification of 300 times and, on the right, shows the blocked portion of the left side photograph at a magnification of 1500 times.

Referring to FIGS. 5 and 6 (axial face illustrated), a clad fiber according to the invention has a single crystal KBr core and a polycrystalline KCl clad. Note that there are only few cleavage defects at the core-clad boundary. Even at higher magnifications (FIG. 6), the boundary shows very few cleavage defects. FIGS. 7 and 8 illustrate core-clad fibers made according to the prior art technique of extruding a composite billet of a core billet surrounded by a cladding sleeve. Note the jagged clad-core boundary and the numerous crystal boundary within the core material.

The products made according to the present invention, represent a significant step forward in the area of low transmission-loss cladded optical fibers.

The invention will now be described in greater detail with reference to the following non-limiting Example.

EXAMPLE 1

A cylindrical billet of KBr and a cylindrical billet of KCl, comprising the core and cladding materials, respectively, are extruded by an apparatus as described above. The temperature of both the core halide and cladding halide at extrusion is 710° C. The plunger forces are about 900 pounds for the core plunger and about 1900 pounds for the clad plunger. Extrusion is carried out in an argon atmosphere at a fiber fabrication velocity of 48 inches/min. FIGS. 5 and 6 are representative of the product.

EXAMPLE 2

A billet of AgBr and of AgCl, comprising the core and cladding materials, respectively, are extruded by an apparatus as described above. The temperature of both the core halide and cladding halide at extrusion is 300 degrees C. The plunger forces are about 1300 pounds for the core plunger and about 2000 pounds for the clad plunger. Extrusion is carried out in an argon atmosphere at a fiber velocity of 48 "/min. FIG. 5 is representative of the product.

The present invention may be embodied in other specific forms without departing from the spirit or essential attributes thereof and, accordingly, reference should be made to the appended claims, rather than to the foregoing specification, as indicating the scope of the invention.

We claim:

1. A process for manufacturing a cladded optical fiber comprising the steps of:
    (a) extruding a first halide from a first chamber, to form the fiber core;
    (b) extruding a second halide from a second chamber into contact with said core, to form a cladding around said core; and
    (c) joining said cladding and said core.

2. A process for manufacturing a cladded optical fiber comprising the steps of:
    (a) extruding a first halide, to form a fiber core; and
    (b) coaxially extruding a second halide onto said core, to form a cladding around said core.

3. The process according to claim 1 further comprising:
    heating said first and second halides to temperatures just below the respective melting temperature of said halides.

4. The process according to claim 1 further comprising:
    circulating a gas for removing contaminants around said halides.

5. The process according to claim 1 further comprising:
    providing a direct plunger means to extrude at least one of said halides.

6. The process according to claim 1 further comprising:
    providing a hydrostratic plunger means to extrude at least one one of said halides.

7. The process according to claim 1 wherein said core and said cladding comprise at least one halide selected from the group consisting of metal halides, alkali earth halides, alkali halides and mixtures thereof.

8. The process according to claim 1 wherein said core and said cladding comprise at least one halide selected from the group consisting of Group Ia halides, Group Ib halides, Group IIIa halides, and mixtures thereof.

9. The process according to claim 1 wherein said core and said cladding comprise at least one halide selected from the group consisting of NaCl, NaBr, NaI, KCl, KBr, CsI, CsBr, AgBr, AgCl, AgI, TlBr, TlCl, Tl, I, thallium bromide-iodide and thallium-bromide-chloride and mixtures thereof.

10. The process according to claim 1 wherein the extrusion die for extruding said first halide from said first chamber and said second halide from said second chamber is made of a solid ceramic material.

11. A process for fabricating a low transmission loss cladded halide fiber waveguide for transmission of infrared frequencies comprising:
    (a) providing a first billet of a first halide compound, having a first index of refraction, in a first chamber;
    (b) providing a second billet of a second halide compound, having an index of refraction less than said first index of refraction, in a second chamber;
    (c) heating said first and second billets to a temperature, said temperature rendering said first and second halide compounds ductile and said temperature being just below the melting temperature of said first and second halide compounds; and
    (d) coaxially extruding said first and second halide compounds through a die to form a cladded optical fiber having a core of said first halide compound and a cladding of said second halide compound.

12. A process according to claim 11 wherein the die is formed from a solid ceramic material.

13. A process according to claim 12 wherein the die is formed of the compound Si—Al—O—N.

14. A process according to claim 11 wherein the steps of heating and extrusion are carried out in an atmosphere of inert gas.

15. A process according to claim 11 wherein said first and second billets are extruded by actuation of a plunger means in each chamber.

16. A process according to claim 11 where the fiber core comprises a substantially single crystal.

17. The process according to claim 11 wherein said core and said cladding comprise at least one halide selected from the group consisting of Group Ia halides, Group Ib halides, Group IIIa halides and mixtures thereof.

18. The process according to claim 11 wherein said core and said cladding comprise at least one halide selected from the group consisting of NaCl, NaBr, NaI, KCl, KBr, CsI, CsBr, AgBr, AgCkl, AgI, TlBr, TlCl, Tl, I, thallium bromide-iodide and thallium-bromide-chloride and mixtures thereof.

19. The process according to claim 2 further comprising:
    heating said first and second halides to temperatures just below the melting temperature of said halides.

20. The process according to claim 2 further comprising:
    circulating a gas for removing contaminants around such halides.

21. The process according to claim 2 further comprising:
    providing a direct plunger means to extrude one said halide.

22. The process according to claim 2 further comprising:
    providing a hydrostatic plunger means to extrude one said halide.

23. The process according to claim 2 wherein said halides are selected from the group consisting of metal halides, alkali earth halides, alkali halides and mixtures thereof.

24. The process according to claim 2 wherein said halides are selected from the group consisting of Group Ia halides, Group Ib halides, Group IIIa halides and mixtures thereof.

25. The process according to claim 2 wherein said halides are selected from group consisting of NaCa, NaBr, NaI, KCl, KBr, CsI, CsBr, AgBr, AgCl, AgI, TlBr, TlCl, TlI, thallium bromide-iodide and thallium bromide-chloride and mixtures thereof.

26. The process according to claim 2 further comprising:
    providing an extrusion die made of a solid ceramic material.

27. A process in accordance with claim 2 wherein said first halide has an index of refraction greater than the index of refraction of said second halide.

28. A process of fabricating a low-loss cladded halide fiber waveguide for transmission of infrared frequencies, said process comprising the step of:
    (a) forming a first ingot of a first halide having a first index of refractions;
    (b) forming a second ingot of a second halide having an index of refraction less than said first index of refraction;
    (c) heating said first and said second ingots to a temperature that renders said first and said second halides ductile; and
    (d) extruding said first ingot through a first extrusion die to form a core and extruding said second ingot through a second extrusion die to form a cladding, said core and said cladding simultaneously passing through said first and said second extrusion dies, respectively.

* * * * *